(12) United States Patent
Lin et al.

(10) Patent No.: US 10,250,865 B2
(45) Date of Patent: Apr. 2, 2019

(54) APPARATUS AND METHOD FOR DUAL IMAGE ACQUISITION

(71) Applicant: Visiony Corporation, Dover, DE (US)

(72) Inventors: Yu-Cheng Lin, New York, NY (US); Dawei Liu, Fort Lee, NJ (US); Yinsheng Guo, Evanston, IL (US); Po-Chun Yeh, Cupertino, CA (US)

(73) Assignee: VISIONY CORPORATION, Dover, DE (US)

(*) Notice: Subject to any disclaimer, the term of this patent is extended or adjusted under 35 U.S.C. 154(b) by 253 days.

(21) Appl. No.: 15/335,960

(22) Filed: Oct. 27, 2016

(65) Prior Publication Data

US 2018/0124379 A1    May 3, 2018
US 2018/0227565 A9    Aug. 9, 2018

Related U.S. Application Data

(60) Provisional application No. 62/247,165, filed on Oct. 27, 2015.

(51) Int. Cl.
| | |
|---|---|
| *H04N 13/239* | (2018.01) |
| *G03B 17/14* | (2006.01) |
| *G02B 7/12* | (2006.01) |
| *G03B 35/08* | (2006.01) |
| *G02B 21/22* | (2006.01) |
| *G02B 21/36* | (2006.01) |
| *H04N 5/225* | (2006.01) |
| *H04N 13/194* | (2018.01) |
| *G02B 25/00* | (2006.01) |
| *H04N 13/00* | (2018.01) |

(Continued)

(52) U.S. Cl.
CPC ............. *H04N 13/239* (2018.05); *G02B 7/12* (2013.01); *G02B 21/22* (2013.01); *G02B 21/362* (2013.01); *G02B 25/001* (2013.01); *G03B 17/14* (2013.01); *G03B 17/565* (2013.01); *G03B 35/08* (2013.01); *H04N 5/2252* (2013.01); *H04N 5/2254* (2013.01); *H04N 13/00* (2013.01); *H04N 13/194* (2018.05); *H04N 13/204* (2018.05); *H04N 2213/001* (2013.01)

(58) Field of Classification Search
CPC .... H04N 13/239; H04N 13/204; H04N 13/00; H04N 13/194; H04N 5/2252; H04N 5/2254; H04N 2213/001; G03B 17/565; G03B 17/14; G03B 35/08; G02B 25/001; G02B 21/362; G02B 21/22; G02B 7/12
USPC .......................................... 348/47
See application file for complete search history.

(56) References Cited

U.S. PATENT DOCUMENTS

2009/0231699 A1* 9/2009 Nakamura ............. G02B 7/002
359/481
2009/0268284 A1* 10/2009 Yamamoto ............. G02B 23/18
359/401

(Continued)

*Primary Examiner* — Allen C Wong
(74) *Attorney, Agent, or Firm* — Yong Chen (57) ABSTRACT

A dual image capture assembly for acquiring and transmitting images from a binocular scope for three-dimensional (3D) viewing on a user computing device. The dual image capture assembly includes a pair of eyepiece adaptors each configured to attach on the pair of eyepieces of a binocular scope, and a dual-camera apparatus including a pair of image capture devices respectively coupled with the pair of eyepiece adaptors. The dual-camera apparatus also includes a linker connecting the first and second camera components.

19 Claims, 6 Drawing Sheets

(51) Int. Cl.
*G03B 17/56* (2006.01)
*H04N 13/204* (2018.01)

(56) References Cited

U.S. PATENT DOCUMENTS

2015/0103021 A1* 4/2015 Lim .................. G06F 3/017
                                              345/173
2016/0044295 A1* 2/2016 Unten ................ H04N 13/239
                                              348/50

* cited by examiner

APPARATUS AND METHOD FOR DUAL IMAGE ACQUISITION

CROSS REFERENCE TO RELATED APPLICATION

This application claims priority to U.S. Provisional Patent Application No. 62/247,165, filed Oct. 27, 2015, the disclosure of which is incorporated herein by reference in its entirety.

BACKGROUND

This invention relates to apparatus and methods for capturing digital images from binocular scopes and transmitting the acquired images to user devices.

Stereo microscopes provide binocular three-dimensional (3D) vision which is invaluable in a range of fields such as education, manufacturing, medical and scientific research. Despite the wide use of stereo microscopes, the technology has been limited by the requirement of physical proximity between the individual operator and the microscope. The operator needs to observe the object in person through two eyepieces at once. Meanwhile, conventional 2D image captured by a single camera does not preserve the 3D depth information. Therefore, only one person can perceive and use the 3D vision at any given time, and such 3D information cannot be shared or used for further application.

SUMMARY OF THE INVENTION

In one aspect of the present invention, a dual image capture assembly (or simply "assembly" hereinafter) is provided. In some embodiments, the assembly includes a dual eyepiece adaptor apparatus, which includes a first eyepiece adaptor and a second eyepiece adaptor. Each of the first and second eyepiece adaptors has a lumen with an axial axis, a front end and a back end, and includes a plurality of gripping elements movable to engage and disengage an outer wall of an eyepiece of a binocular scope. The assembly further includes a dual-camera apparatus, which includes a first camera component coupled with the first eyepiece adaptor and a second camera component coupled with the second eyepiece adaptor. The first camera component includes a first image capture device having an optical axis aligned with the lumen axis of the first eyepiece adaptor, and the second camera component includes a second image capture device having an optical axis aligned with the lumen axis of the second eyepiece adaptor. The dual-camera apparatus further includes a linker connecting the first and second camera components. In some embodiments, the linker is adjustable to vary the distance between the first and second camera components.

In some embodiments, the longitudinal distance between the front end and the back end of each of the first and second eyepiece adaptors is adjustable.

In some embodiments, the plurality of movable gripping elements comprise at least three screws disposed radially symmetrically about the lumen axis and movable radially toward and away from the lumen axis.

In some embodiments, the plurality of movable gripping elements of each of the first and second eyepiece adaptors are mounted on a longitudinally adjustable tubular component.

In some embodiments, each of the eyepiece adaptors comprises an iris component.

In some embodiments, each of the first eyepiece adaptor and the second eyepiece adaptor further comprises a longitudinally adjustable tubular component coupled with the iris component. The longitudinally adjustable tubular component can include an inner tube and an outer tube that are coupled through a screw-type coupling.

In some embodiments, the linker includes at least a first segment and a second segment, the first and second segments being rotatable against each other about a first pivoting axis which is perpendicular to each of the optical axes of the first and second image capture devices.

In some embodiments, the first segment of the linker has a first end pivotably joined with the first camera component along a second pivoting axis, and the second segment of the linker has a first end pivotably joined with the second camera component along a third pivoting axis. The first, second, and third pivoting axes are parallel to each other and each perpendicular to each of the optical axes of the first and second image capture devices. In this manner, the optical axes of the first and second image capture devices are maintained on a same plane.

In some embodiments, the first segment and the second segment of the linker each have a second end pivotably joined with a third segment.

In some embodiments, each image capture device further comprises a communication component which can be operatively connected to a computing device whereby images captured by each image capture device are transmitted to the computing device.

In another aspect of the present invention, a method of acquiring and transmitting images from a binocular scope is provided. The method includes acquiring a pair of digital images from a binocular scope and transmitting to a computing device for 3D viewing by a user. In some embodiments, the first eyepiece adaptor and the second eyepiece adaptor of the dual eyepiece adaptor apparatus of the dual image capture assembly as described herein are engaged onto a pair of eyepieces of a binocular scope, respectively. A pair of digital images of a target object are acquired by the first and second image capture devices of the dual image capture assembly. The acquired pair of images are then transmitted to a user computing device for three-dimensional viewing by a user. In some embodiments of the method, the pair of images are first transmitted from the first and second image capture devices to a server computer, which then transmit the pair of images to the user computing device. In some embodiments of the method, the user computing device includes a stereoscopic viewer. In other embodiments, the user computing device is a smart mobile phone.

BRIEF DESCRIPTION OF THE DRAWINGS

Certain embodiments of the present invention are described with reference to the drawings herein, where like references denote like elements across different drawings.

DETAILED DESCRIPTION OF CERTAIN EMBODIMENTS OF THE INVENTION

The disclosed subject matter provides a dual image capture assembly for acquiring images as viewed from pair of eyepieces of a binocular scope (such as a stereo microscope or a stereo telescope). For example, the assembly can be used to retrofit on existing stereo microscopes to realize digital 3D vision as well as 3D reconstruction with stereo microscopic images. Embodiments of the dual image capture assembly can include features that allow it to be adaptable to stereo microscopes with variable geometric specifications, including variability in (1) eyepiece diameter, (2) eyepiece focal distance, (3) inter-eyepiece distance and (4) inter-axial angle between the optical axes of the two eyepieces. The assembly can be used for class or museum education of biology or related courses, electronic assembly and quality inspection for manufacturing, microsurgery, dentistry, forensic science, and animal study for medical and scientific research.

Figure 1A:
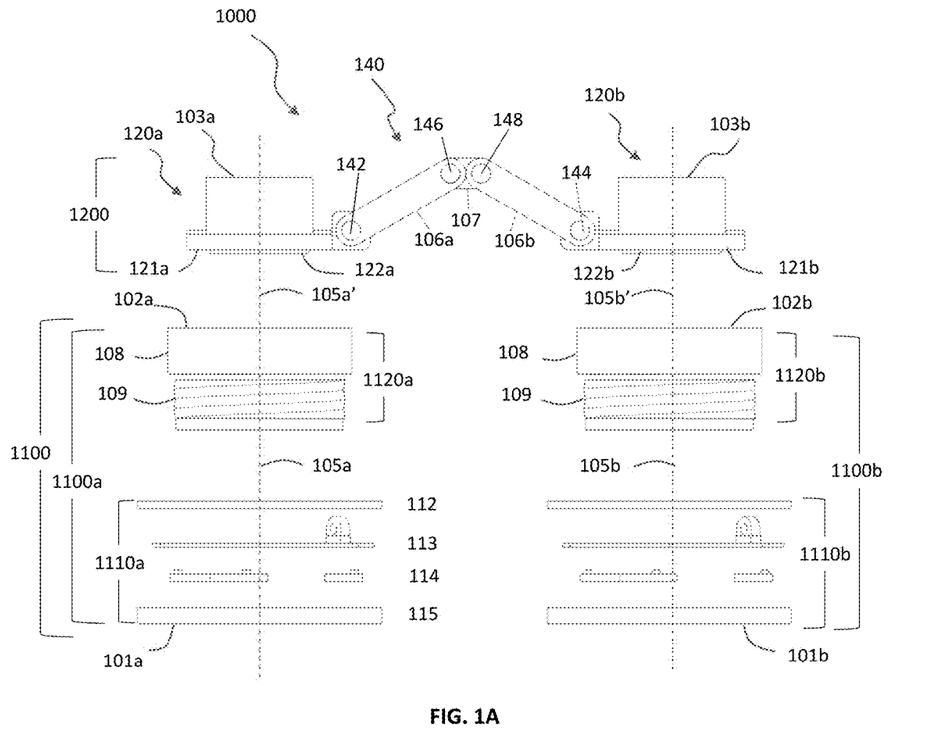
FIG. 1A depicts an exploded view of a dual image capture assembly according to some embodiments of the present invention.
Figure 4:
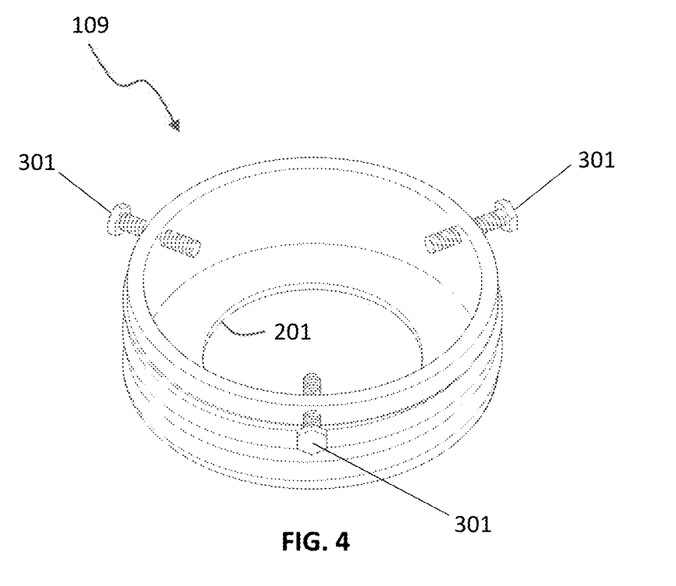
FIG. 4 illustrates a partial structure of an eyepiece adaptor according to some embodiments of the present invention.
Figure 5:
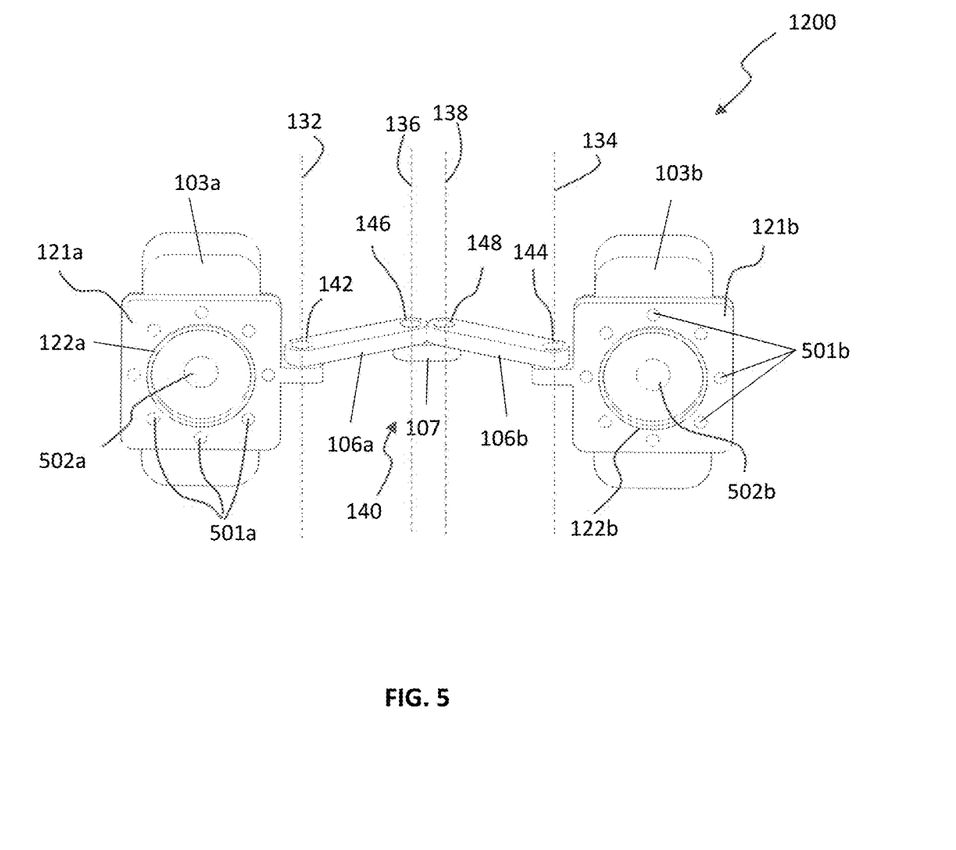
FIG. 5 schematically shows a dual-camera apparatus portion of a dual image capture assembly according to some embodiments of the present invention.

FIG. 1A illustrates an embodiment of a dual image capture assembly 1000 of the present invention. The assembly 1000 includes a dual eyepiece adaptor apparatus 1100, which includes a first eyepiece adaptor 1110a and a second eyepiece adaptor 1110b. Each of the first and second eyepiece adaptors (1110a, 1110b) has a lumen (or aperture, shown as 201 in FIGS. 2A, 3A, 3B, and 4) with an axial axis (105a, 105b), a front or proximal end (101a, 101b) and a back or distal end (102a, 102b). Each eyepiece adaptor includes a plurality of gripping elements 114 which are movable to engage and disengage an outer wall of an eyepiece of a binocular scope, e.t., a stereomicroscope (not shown). The assembly 1000 further includes a dual-camera apparatus 1200, which includes a first camera component 120a which includes a first image capture device 103a having an optical axis 105a' aligned with the lumen axis 105a of the first eyepiece adaptor 1110a, and a second camera component 120b which includes a second image capture device 103b having an optical axis 105b' aligned with the lumen axis 105b of the second eyepiece adaptor 1110b. (Camera lens 502a and 502b are shown in FIG. 5.) The first image capture device 103a is supported by a first camera mounting frame 121a, and the second image capture device 103b is supported by a second camera mounting frame 121b.

The dual-camera apparatus 1200 further includes a linker 140 connecting the first and second camera components. The linker 140 can be adjustable to vary the distance between the first camera component 120a and the second camera components 120b. As discussed further below, the linker 140 can also be adjustable to vary the orientation of the optical axes of the first and second camera components.

Figure 1B:
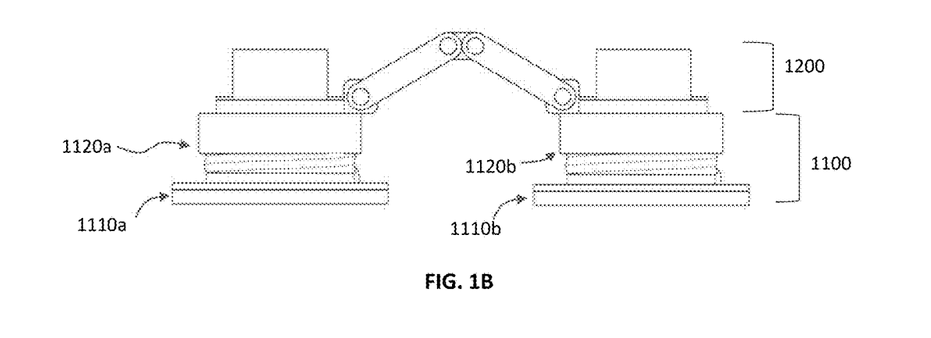
FIG. 1B depicts an assembled view of the dual image capture assembly shown in FIG. 1A.

It is understood that the parts/elements of the dual-camera assembly shown in FIG. 1A are a vertically exploded view to more clearly show the structure of the assembly. The assembly with all parts assembled in a deployment condition is shown in FIG. 1B (which for brevity only shows certain major components: iris components (1110a, 1110b) and tubular components (1120a, 1120b), which together constitute the adaptor apparatus 1100; and the dual-camera apparatus 1200)).

As shown in FIG. 1, each of the eyepiece adaptors 1100a and 1100b includes an iris component 1110a and 1110b, respectively. The general iris (diaphragm) mechanism was invented in the 19th century and has since been used in a wide variety of devices including camera shutter and hydraulic valves. The iris component of the present disclosure provides a simplified design. Take iris component 1110a as an example, and with reference to FIGS. 2A-2C, it includes a first casing 115 having three fixed protrusions 1151 disposed radially symmetrically about the lumen axis 105a, a revolving disc 113 having at least three slots 1131 rotationally symmetrically disposed about the lumen axis 105a, each slot having a first slot end 1131a and a second slot end 1131b. The first and second slot ends 1131a and 1131b have unequal distance from the lumen axis 105a (e.g., the slot 1131 can follow the shape of an involute curve).

The iris component 1110a includes three movable gripping elements (or blades) 114 sandwiched between the first casing and the revolving disc. As more clearly shown in FIG. 2C, each blade 114 includes a first end 1141, a second end 1142, and an elbow portion 1143. A hole 1145 is disposed proximate the first end 1141, which is aligned with and engages a corresponding protrusion 1151 of the first casing 115. A protrusion 1146 is disposed proximate the elbow portion 1143, and is aligned with and engages a corresponding slot 1131 of the revolving disc 113. When the revolving disc 113 is rotated about the lumen axis 105a, the blade 114 is actuated and rotated, causing the second end 1142 of each blade 114 to move toward or away from the lumen axis 105a to thereby engage or disengage an eyepiece of a stereo microscope.

Figure 2A:
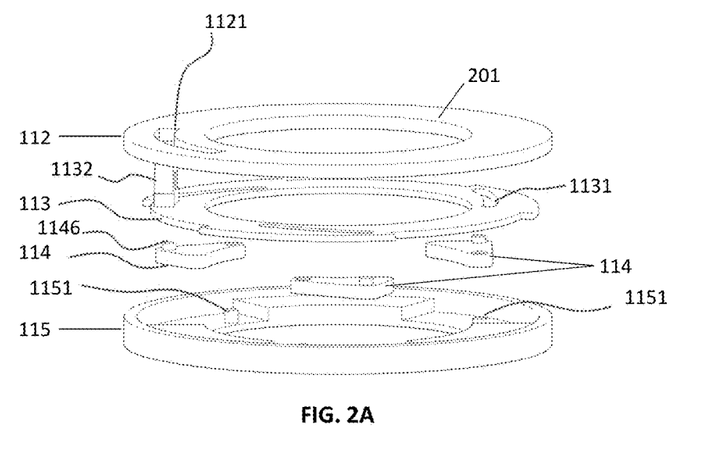
FIGS. 2A-2C schematically depict the structure of an iris component (and structural elements thereof) of an eyepiece adaptor according to some embodiments of the present invention.
Figure 2B:
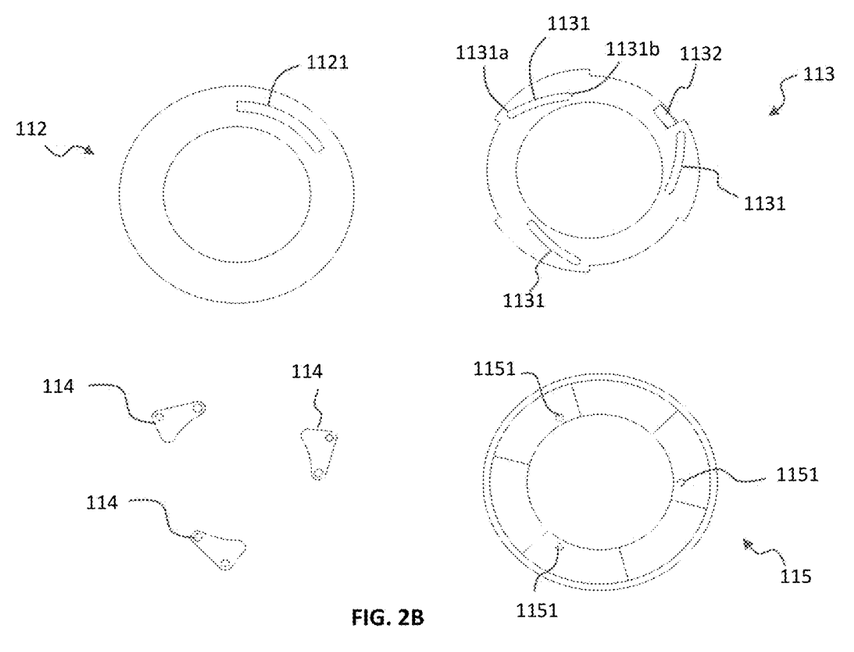
Figure 2C:
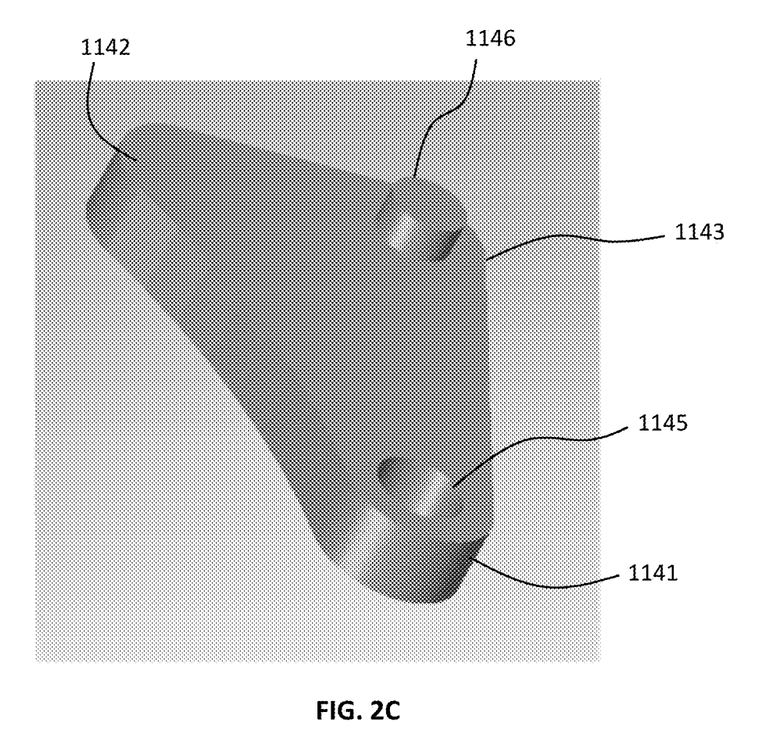

As shown in FIGS. 1 and 2A-2B, the iris component 1110a can further include a grasping element 1132 on an outer edge of the revolving disc 113, as well as second casing 112 adjacent the revolving disc 113 and disposed on the other side of the blades 114. The second casing 112 includes a partial circular slot 1121. The grasping element 1132 of the revolving disc 113 engages and can move along inside the partial circular slot 1121, which enables the revolving disc 113 to rotate about the lumen axis 105a (to thereby move the second ends of the blades toward or away from the lumen axis 105a).

It is understood that the structure of the iris component described herein is merely illustrative and not limiting. Including only three blades preserves the ability to center the eyepiece adaptor lumen to be coaxial with that of the eyepiece. However, more blades can be included (in such a case, those elements on the top casing 115 and revolving disc 113 can be altered to accommodate more blades), and different shapes of the blades may also be used other than those shown in FIGS. 2A-2C.

As seen in FIG. 1, the dual eyepiece adaptor apparatus 1100 can further include longitudinally adjustable tubular components 1120a and 1120b each coupled with the respective iris components 1110a and 1110b. As further illustrated in FIGS. 3A and 3B, the longitudinally adjustable tubular component 1120a includes an inner tube 109 and an outer tube 108, the inner tube and the outer tube being coupled through a screw-type coupling, which utilizes the inner screw threads 1082 of the outer tube 108 and the outer screw threads 1092 of the inner tube 109. The relative screw motion between the inner tube 109 and the outer tube 108 can thus change the longitudinal length of the tubular component 1120a along the lumen axis 105a, which allows the image capture device 103a to adapt to different focal distances of the eyepiece. While it is shown that that inner tube 109 is coupled to the corresponding iris component, the tube configuration can be modified such that the outer tube 108 can be used to couple with the corresponding iris component.

The iris components are designed such that the eyepiece adaptor apparatus of the present invention can be used for eyepieces having different outer diameter, and the longitudinally adjustable tubular components are designed to adapt to variable focal distance of the eyepiece lens. In alternative embodiments, a simpler design that include both features can be used. As illustrated in FIG. 4, three screws 301 can be directly disposed in a radially symmetric manner on the inner tube 109 (this embodiment can be understood as what is illustrated in FIG. 1 but with the three screws installed on the inner tube 109 and with the iris component 1110a and 1110b removed). In this manner, the advancement and retraction of the screws 301 can be used to engage and disengage the eyepiece, while the relative screw-motion of the inner tube 109 and outer tube 108 provides the tube length adjustment to accommodate variable focal length of the eyepiece lens. It is understood the placement of the screws can vary depending on the configuration of the tubular component. For example, if the outer tube is to be placed on the eyepiece, the screws can be disposed on the outer tube.

As illustrated in FIGS. 1A and 5, the dual image capture assembly 1000 can include a linker 140 which includes a first segment 106a, a second segment 106b, and a third segment 107. The outer end of the first segment 106a is rotatably joined with the first camera component at joint 142 of the camera mounting frame 121a with pivoting axis 132, and the outer end the second segment 106b is rotatably (or pivotably) joined with the second camera component at joint 144 of the camera mounting frame 121b at its outer end with pivoting axis 134. The other (inner) ends of the first segment 106a and the second segment 106b are each rotatably (or pivotably) joined with the third segment 107 at joints 146 and 148 with pivoting axes 136 and 138, respectively. Thus, in this illustrated embodiment, the inter-camera distance and inter-camera-axial angle are both adjustable for stereo microscopes with variable inter-eyepiece distance and inter-axial angle between the optical axes of two eyepieces. In alternative embodiments, the third segment 107 can be omitted, and the first and second segments are directly pivotably joined along a pivoting axis perpendicular to the optical axes of the two image capture devices.

In the arrangement as shown in FIGS. 1A and 5, all of the pivoting axes 132, 134, 136 and 138 are parallel to each other, and all of the segments 106a, 106b, and 107 of the linker 140 are rotatable against each other about an axis perpendicular to each of the optical axes of the first and second image capture devices (103a, 103b). While rotation about the pivoting axes 132 and 138 allow non-parallel arrangement of the optical axes of the first and second image capture devices, the pivot-type connection between the first and second segments 106a and 106b and the parallel arrangements of all pivoting axes ensure that that the optical axes of the first and second image capture devices to be maintained on a same plane. This is critical in maintaining the geometry required for stereo imaging such that the (i) horizontal alignment and (ii) parallel orientation of the two images are not compromised by any movement of the segments of the linker 140. Thus, the two image capturing devices of the dual-camera apparatus can be used to synchronously convert optical information from the two eyepieces of the stereomicroscope to two digital images, respectively, on a single plane, with adjustable inter-camera distance and inter-camera-axial angle.

Figure 3A:
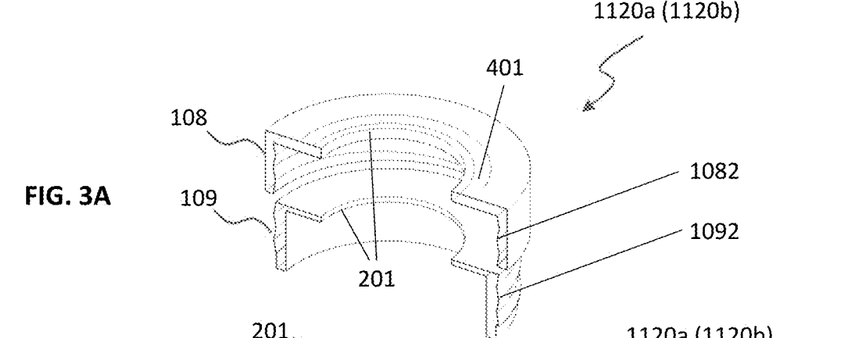
FIGS. 3A and 3B show an adjustable tubular component that utilizes a screw-type coupling between an inner tube and an outer tube of an eyepiece adaptor according to some embodiments of the present invention (FIG. 3A shows an exploded view and FIG. 3B shows an assembled view).
Figure 3B:
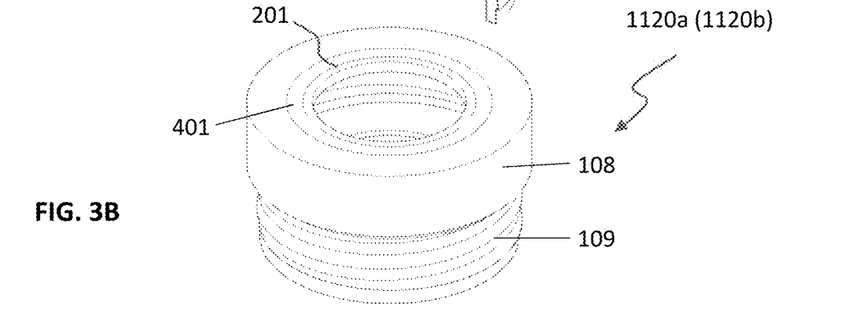

The dual-camera apparatus 1200 can be mechanically latched or screwed on the dual eyepiece adaptor apparatus 1100. Alternatively, and to facilitate convenient coupling and detachment between the respective camera component and the eyepiece adaptor, as illustrated in FIGS. 1A and 5, each camera mounting frame 121a and 121b can include a cylindrical key (122a, 122b), which can take the form of a circular protruding edge, coupled to the lumen 201 at the distal end 102a, 102b of the outer tube 108 of the respective tubular components 1120a, 1120b. As shown in FIGS. 3A, 3B and 5, the coupling mechanism can further include a magnetic docking mechanism, which includes a metal ring 401 around the lumen 201 on the outer tube 108 of the tubular components 1120a/1120b, and a plurality of magnets 501a/501b circularly disposed on the camera mounting frame 121a/121b with respect to the optical axis of each of the lens 502a/502b of the respective image capture devices 103a/103b. The magnets 501a (and 501b) collectively are axially aligned with the metal ring 401 on the outer tube 108 of the tubular component 1120a (and 1120b), allowing for easy docking and detachment while maintaining the coaxial arrangement of the respective eyepiece adaptor and image capture device.

Through the series of mechanical mechanisms described herein, the dual image capture assembly can be coaxially centered on the respective eyepiece of a stereomicroscope with proper focus and orientation for precisely capturing a stereo image pair. Thus, such embodiments of the present invention can accommodate all stereo microscopes regardless of the variations in (1) eyepiece diameter, (2) eyepiece focal distance, (3) inter-eyepiece distance and (4) inter-axial angle between the optical axes of the two eyepieces of the stereomicroscope.

The image capture devices 103a/103b can each include an optical element (e.g., lens 502a/502b as shown in FIG. 5), a shutter, a digital image sensor (e.g., CCD or CMOS sensor), a control command input module whereby the image capture devices can be activated for taking images, and a communication component which can be operatively connected to a first computing device whereby digital images captured by the image capture device are transmitted to the first computing device. The image capture devices may also each include an internal memory. The communication component may include a wired interface, such as USB, or a wireless interface such that the captured images can be transmitted wirelessly to the computing device. The taking and/or transmission of the images can be effected by either a local control (e.g., by an actuator connected to the control command input module of the image capture devices), or by using an input device (a mouse, a keyboard, or a touchscreen, etc.) of the first computing device operatively connected to the image capture devices, on which appropriate software product may be installed to allow a user's control of the functioning of the image capture devices. The first computing device may be a personal computer, a smart mobile phone, a server computer, a work station, etc.

In some embodiments, the first computing device can be a user computing device having a display. A user computing device includes for example a smart mobile phone, a laptop, or a tablet that runs Windows®, Android® or iOS operating systems, etc. When the user computing device itself is not equipped with stereo-image processing or displaying capability, the pair of images that have been acquired by the image capture devices can be shown on the display of the computing device side by side, and the user can further use a separate stereoscopic viewer to visualize the pair of images in 3-D. A typical stereoscopic viewer provides each eye of the observing person with a lens that makes the image seen through it appear larger and more distant and usually also shifts its apparent horizontal position, so that for a person with normal binocular depth perception the edges of the two images seemingly fuse into one "stereo window" to create the 3D perception. An example stereoscopic viewer is Google Cardboard. For purpose of the present invention, a user computing device also includes integrated Augmented Reality (AR) apparatus with stereo-imaging processing and/or displaying capability, which enables a user to visualize the pair of images in 3-D without using additional 3-D viewing aid. Essentially, such integrated AR apparatus already contains a stereoscopic viewer.

In other embodiments, the first computing device may be a server computer (e.g., a web server or cloud server). In these embodiments, the pair of images acquired from the first and second image capture devices of the assembly are first transmitted to the server computer, which includes appropriate software and configured to process and further transmit the pair of images to other computing devices (such as a user computing device described above), e.g., via internet or other network protocols using wired or wireless networks, mobile networks, etc. Through the server computer as an intermediary, the images acquired from the first and second image capture devices of the assembly can be made available to many users as real time (or near real time) images or video feeds, or recorded image/video downloads, thereby making the 3D view experience of any target object under the binocular scope accessible to those who cannot directly observe the target through the binocular scope. This is especially useful in an educational setting, where stereo images from a stereo microscope or stereo telescope can be transmitted live to students or attendees for 3D viewing.

Yet in further embodiments, the images acquired by the assembly of the present invention can be first transmitted to a user computing device, then uploaded to a server computer, and subsequently transmitted to other user computing devices. Any of the computing devices in the chain of image transmission can include image processing software to process the stereo image pair, e.g., to further refine the precise alignment of the stereo image pair, thereby improve the clarity and/or depth of the stereo image in the user computing device. In addition to 3D display, any of the computing devices can include software to process the pair of images received from the assembly for 3D reconstruction of microscopic topography or microscopic 3D particle tracking, so that the derived 3D information can be perceived and/or utilized by the user without having to use a separate stereoscopic viewer.

The description herein merely illustrates the principles of the disclosed subject matter. Various modifications and alterations to the described embodiments will be apparent to those skilled in the art in view of the teachings herein. Further, it should be noted that the language used herein has been principally selected for readability and instructional purposes. Accordingly, the disclosure herein is intended to be illustrative, but not limiting, of the scope of the disclosed subject matter.

What is claimed is:

1. A dual image capture assembly, comprising:
   (a) a dual eyepiece adaptor apparatus including a first eyepiece adaptor and a second eyepiece adaptor, each of the first and second eyepiece adaptors having a lumen with an axial axis, a front end and a back end, and including a plurality of gripping elements movable toward and away from the axial axis to engage and disengage an outer wall of an eyepiece such that each of the first and second eyepiece adaptors can engage and disengage eyepieces of varying diameters, and
   (b) a dual-camera apparatus, comprising:
      (b1) a first camera component coupled with the back end of the first eyepiece adaptor, the first camera component comprising a first image capture device having an optical axis aligned with the lumen axis of the first eyepiece adaptor,
      (b2) a second camera component coupled with the back end of the second eyepiece adaptor, the second camera component comprising a second image capture device having an optical axis aligned with the lumen axis of the second eyepiece adaptor,
      (b3) a linker connecting the first and second camera components.

2. The dual image capture assembly of claim 1, wherein the linker is adjustable to vary the distance between the first and second camera components.

3. The dual image capture assembly of claim 1, wherein the longitudinal distance between the front end and the back end of each of the first and second eyepiece adaptors is adjustable.

4. The dual image capture assembly of claim 1, wherein the plurality of movable gripping elements comprise at least three screws disposed radially symmetrically about the lumen axis and movable radially toward and away from the lumen axis.

5. The dual image capture assembly of claim 4, wherein the plurality of movable gripping elements of each of the first and second eyepiece adaptors are mounted on a longitudinally adjustable tubular component.

6. The dual image capture assembly of claim 1, wherein each of the eyepiece adaptors comprises an iris component, the iris component comprising:
   a first casing having at least three protrusions disposed radially symmetrically about the lumen axis,
   a revolving disc having at least three slots rotationally symmetrically disposed about the lumen axis, each slot having a first slot end and a second slot end, wherein the first and second slot ends have unequal distance from the lumen axis,
   wherein the plurality of movable gripping elements are sandwiched between the first casing and the revolving disc, and comprise at least three blades, each blade including:
      a first end, a second end, and an elbow portion,
      a hole disposed proximate the first end and engaging a corresponding protrusion of the first casing,
      a protrusion disposed proximate the elbow portion and engaging a corresponding slot of the revolving disc,
      whereby when the revolving disc is rotated about the lumen axis, the second end of each blade moves toward or away from the lumen axis.

7. The dual image capture assembly of claim 6, wherein the revolving disc of each of the iris component further comprises a grasping element on an outer edge thereof.

8. The dual image capture assembly of claim 7, wherein each iris component further comprises:
   a second casing adjacent the revolving disc and disposed on an opposing side of the plurality of the at least three blades, the second casing including a partial circular slot configured to engage the grasping element of the revolving disc and allow the grasping element of the revolving disc to rotate about the lumen axis.

9. The dual image capture assembly of claim 6, wherein each of the first eyepiece adaptor and the second eyepiece adaptor further comprises a longitudinally adjustable tubular component coupled with the iris component, the longitudinally adjustable tubular component including an inner tube and an outer tube, the inner tube and the outer tube being coupled through a screw-type coupling.

10. The dual image capture assembly of claim 1, wherein the linker includes at least a first segment and a second segment, the first and second segments being rotatable against each other about a first pivoting axis which is perpendicular to each of the optical axes of the first and second image capture devices.

11. The dual image capture assembly of claim 10, wherein the first segment has a first end pivotably joined with the first camera component along a second pivoting axis, and the second segment has a first end pivotably joined with the second camera component along a third pivoting axis, the first, second, and third pivoting axes are parallel to each other and each perpendicular to each of the optical axes of the first and second image capture devices, such that the optical axes of the first and second image capture devices are maintained on a same plane.

12. The dual image capture assembly of claim 11, wherein the first segment and the second segment each have a second end pivotably joined with a third segment.

13. The dual image capture assembly of claim 1, wherein the first camera component comprises a camera mounting frame which includes a cylindrical key configured to engage the lumen of the first eyepiece adaptor.

14. The dual image capture assembly of claim 13, wherein the camera mounting frame comprises a plurality of circularly disposed magnets.

15. The dual image capture assembly of claim 1, wherein each image capture device further comprises a communication component operably connected to a computing device whereby images captured by each image capture device are transmitted to the computing device.

16. A method of acquiring and transmitting images from a binocular scope using a dual image capture assembly comprising:
a dual eyepiece adaptor apparatus including a first eyepiece adaptor and a second eyepiece adaptor, each of the first and second eyepiece adaptors having a lumen with an axial axis, a front end and a back end, and including a plurality of gripping elements movable toward or away from the axial axis to engage and disengage an outer wall of an eyepiece such that each of the first and second eyepiece adaptors can engage and disengage eyepieces of varying diameters, and
(b) a dual-camera apparatus, comprising:
(b1) a first camera component coupled with the first eyepiece adaptor, the first camera component comprising a first image capture device having an optical axis aligned with the lumen axis of the first eyepiece adaptor,
(b2) a second camera component coupled with the second eyepiece adaptor, the second camera component comprising a second image capture device having an optical axis aligned with the lumen axis of the second eyepiece adaptor,
(b3) a linker connecting the first and second camera components,
the method comprising:
engaging the first eyepiece adaptor and the second eyepiece adaptor of the dual eyepiece adaptor apparatus of the dual image capture assembly onto a pair of eyepieces of a binocular scope, respectively;
acquiring a pair of images of a target object by the first and second image capture devices of the dual image capture assembly;
transmitting the pair of images to a user computing device for three-dimensional viewing by a user.

17. The method of claim 16, wherein the transmitting comprises:
transmitting the acquired pair of images from the first and second image capture devices to a server computer, and transmitting the pair of images from the server computer to the user computing device.

18. The method of claim 16, wherein the user computing device includes a stereoscopic viewer.

19. The method of claim 16, wherein the user computing device is a smart mobile phone.

* * * * *